United States Patent [19]
Mai

[11] Patent Number: 6,002,508
[45] Date of Patent: Dec. 14, 1999

[54] OPTICAL SCANNER

[75] Inventor: Che-Kuei Mai, Hsinchu, Taiwan

[73] Assignee: Umax Data Systems Inc., Hsinchu, Taiwan

[21] Appl. No.: 09/191,537

[22] Filed: Nov. 13, 1998

[51] Int. Cl.$^6$ .................................................. G02B 26/08
[52] U.S. Cl. .......................... 359/212; 359/215; 358/483; 358/496; 358/497
[58] Field of Search ..................................... 359/196, 210, 359/212–215, 223; 358/474, 483, 494, 496, 497, 498, 444

[56] References Cited

U.S. PATENT DOCUMENTS

| | | | |
|---|---|---|---|
| 5,301,244 | 4/1994 | Parulski | 358/453 |
| 5,430,289 | 7/1995 | Erickson et al. | 250/205 |
| 5,508,821 | 4/1996 | Murata | 358/442 |

*Primary Examiner*—James Phan
*Attorney, Agent, or Firm*—Dougherty & Troxell

[57] ABSTRACT

An optical scanner with the scanning and transmission control circuit board removed out of the scanning casing and formed in an interface card connectable to an interface connector located on a computer motherboard. The interface card has an interface socket connectable with a cable which wires respectively to an optical scanning means and a transmission means of the scanner. Computer power supply provides power needed in the scanner through the cable. Scanning signals are transmitted through the cable between the scanning means and the interface card. The interface socket may be a high speed one (such as an IDE) without sharing with a printer on a low speed parallel port like a conventional scanner. Since the control circuit board is located outside the scanner, the scanner may be made thin and smaller size, thus saving packaging, warehousing and transportation costs. Without sharing a parallel port with a printer, the scanning and printing processes may be performed concurrently at high speed. Power supply is located in the computer metallic casing, electromagnetic interference is thus greatly reduced.

24 Claims, 5 Drawing Sheets

OPTICAL SCANNER

BACKGROUND OF THE INVENTION

1. Field of the Invention

This invention relates to an optical scanner and particularly to an optical scanner which has the required control circuit built in an interface card connectable with an interface connector located in a motherboard of a computer.

2. Description of the Prior Art

A conventional flatbed optical scanner 1 like the one shown in FIG. 1 generally includes a casing 11, a scanning means 12, a control circuit board 14 located in the casing 11 and a power supply 5. A scanning document 3 is placed on a transparent glass 16 and covered by a cover 17. The scanning means 12 is moved to and fro by means of a motor 18 and a transmission means 13 along a guide rod 134 to scan the document 3. The data and image being scanned is converted to computer acceptable format by the control circuit board 14 and fed to a parallel port 24 of the computer 2 through a cable 25. The power needed in the scanner is provided by a DC power supply 5 (DC transformer) to the control circuit board 14 which further wires respectively to the scanning means 12 and the motor 18 via a signal line 141 and a power line 142 for controlling the motion of the scanning means 12 and the motor 18. The transmission means 13 usually includes a reducing gear 131, a belt 132 or steel cable and a plural number of rollers 133. In the construction set forth above, the control circuit board 14 is located in the casing 11, and an extra power supply 5 provides the power needed. It has the following drawbacks:

1. It is difficult to shrink the size of the scanner. As the scanning means 12 has to move a full range to completely cover the document 3 edge to edge, the width and length of the scanner 1 has certain minimum limitation, e.g., should be larger than an A4 size paper. In order to make the scanner smaller size to fit other equipment such as a computer, the height of the scanner becomes the only variable attackable. The scanning means 12, transmission means 13 and guide rod 134 have some physical working requirements. The control circuit board 14 and its protection shield 15 located thereabove usually take 10–20% of the height of the casing 11. Furthermore the casing 11 usually has connector sockets reserved for other purpose, such as a power socket 191 for connecting with the power supply 5, a printer socket 192 for a printer 4 and a CPU socket 193 for connecting to the computer 2. All this making it difficult to cut the height of a conventional scanner.

2. Limitation of transmission interface.

Conventional scanner transmits capturing data and image to the computer through a parallel port which is generally a low speed interface and consequently drags down overall scanning efficiency. Furthermore a personal computer generally has only one parallel port. If a user wants to connect a printer and a scanner to the computer at the same time, these two devices have to connect in series to the same parallel port. It creates a lot of usage inconvenience.

3. Difficult to cut cost.

As mentioned before, with the control circuit board 14 located in the casing 11, total height of the casing 11 will increase 10–20%. Package materials, storage space and cost, and transportation cost will also increase by 10–20%. Power supply 5 will become another extra cost. Not only the cost of the power supply 5 itself may become extra cost of the scanner, but also the power supply 5 will add even more weight and size. In addition, when a user wants to use a notebook computer outdoors without a power socket, the scanner cannot be connected or functioned.

4. High electromagnetic interference (EMI)

Most conventional scanners has plastic casing 11 which has poor EMI protection. The control circuit board 14 will generate electromagnetic wave during scanning operation and will result in EMI to other electronic devices or even human bodies located nearby.

SUMMARY OF THE INVENTION

In view of aforesaid disadvantages, it is therefore an object of this invention to provide a scanner that has compact size, faster transmission interface, lower EMI and low cost of production.

In order to achieve the object set forth above, this invention has the control circuit board (CCB) removed out of the scanner and has the CCB formed in an interface card (or "gold finger" as commercially called) engageable with an interface connector of a computer. A cable is provided to connect the interface card with the scanner for signal and power transmission. Because the scanner has no CCB and a protection shield located therein, the height of the scanner may be reduced by 10–20% (or about 2–3cm). By moving the connection to the computer, other high speed interface such as IDE may be used solely for the scanner instead of sharing a low speed parallel port with a printer. Total performance and flexibility is greatly enhanced. Power supply needed in the scanner may be provided by the computer, therefore a separate power supply may be saved. It thus further reduces weight and cost. As CCB is now located inside the computer and is shielded by a metallic casing of the computer, EMI is greatly reduced. The smaller size of the scanner results in lower cost in packaging, warehousing and transportation.

The scanner according to this invention includes an optical scanning means, a transmission means, a casing, an interface card and a cable. The optical scanning means will convert data and image into digital signals. The transmission means moves the optical scanning means for scanning process. The casing houses the optical scanning means and the transmission means therein. The interface card has a control circuit for scanning and controlling transmission means and a contact engageable with an interface connector located in a computer. The cable connects the interface card with the optical scanning means and the transmission means for signals and power transmission needed for the scanner.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
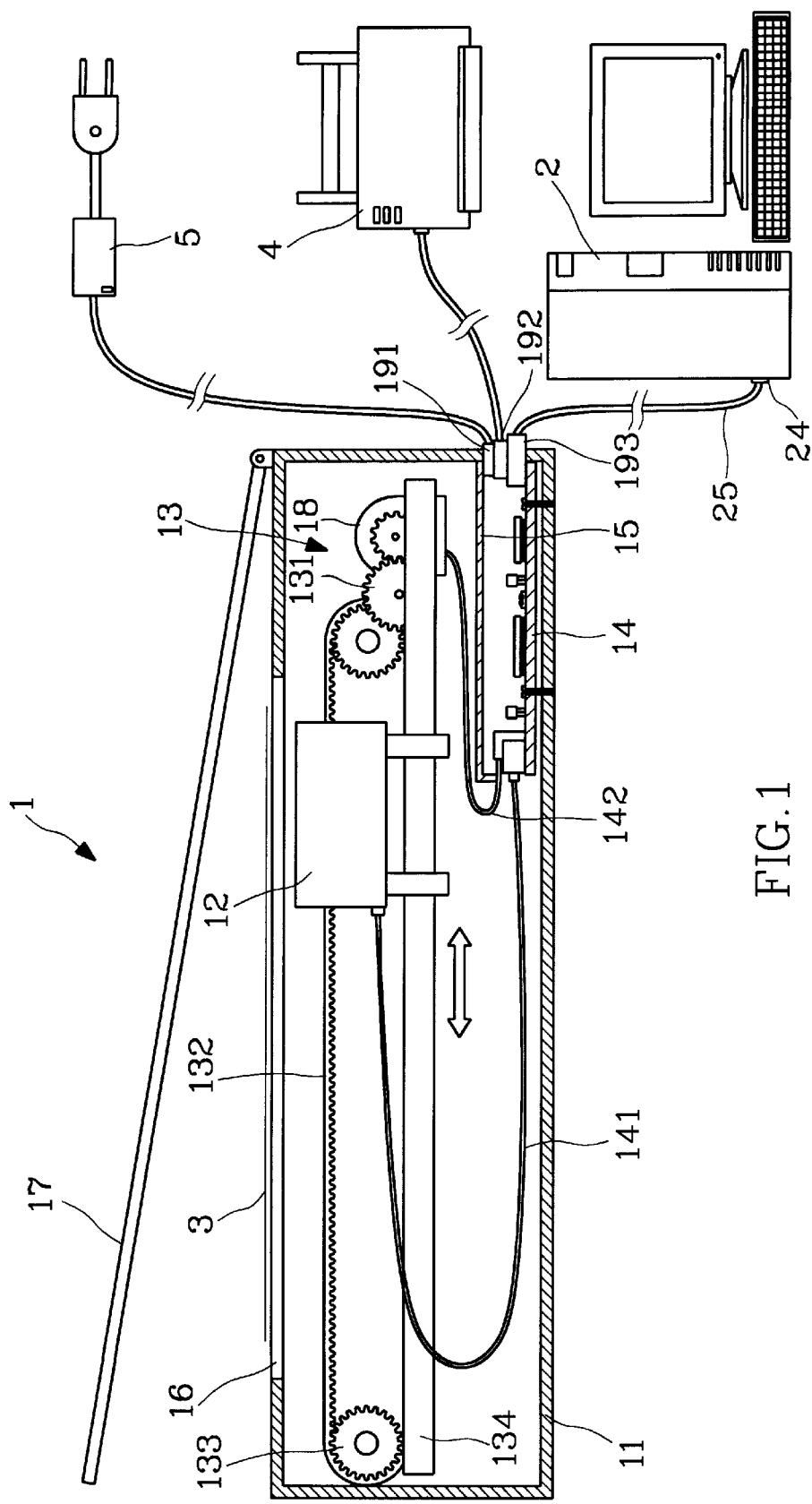
FIG. 1 is a sectional side view of a conventional scanner connecting with a computer and a printer.
Figure 2:
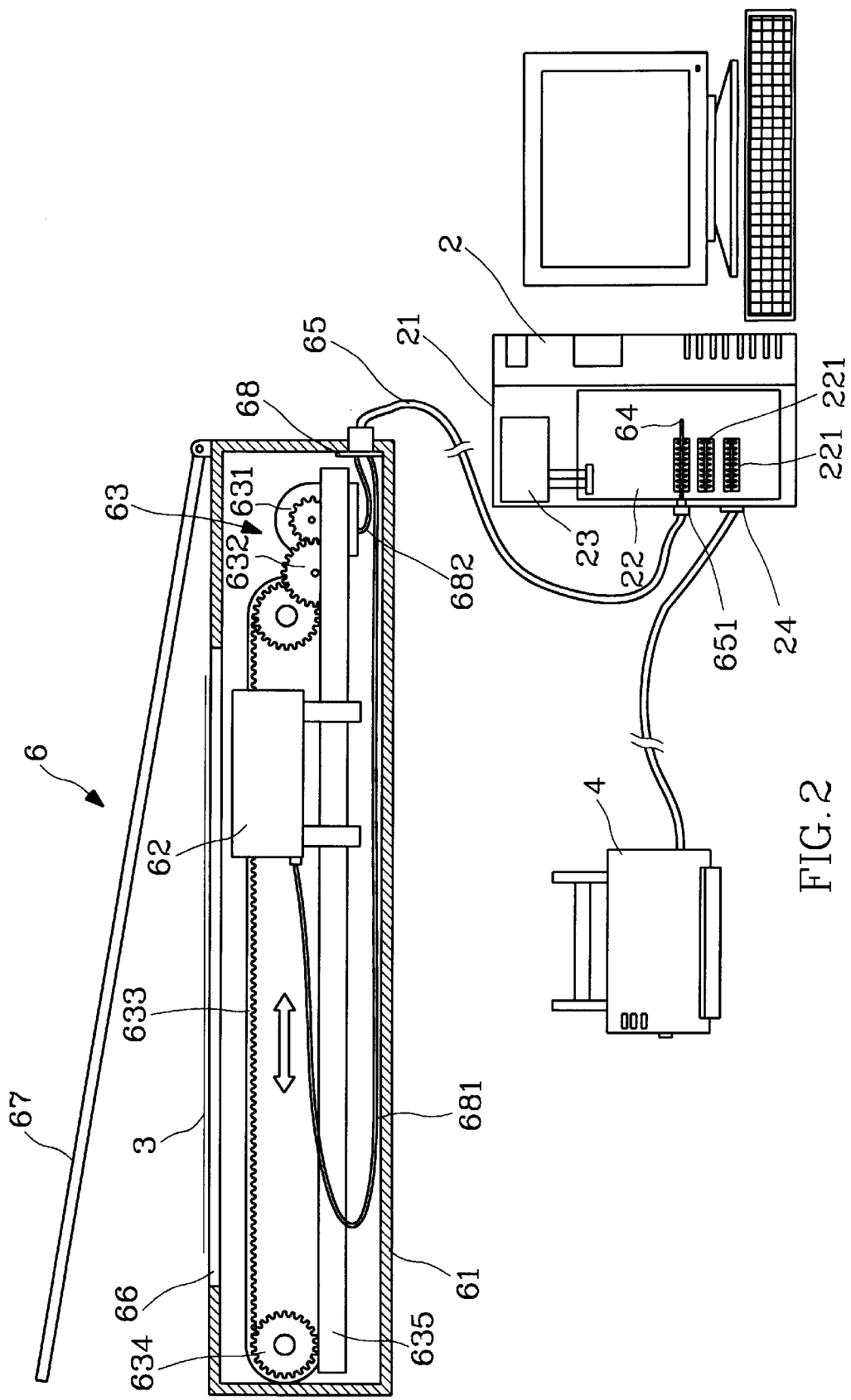
FIG. 2 is a sectional side view of this invention connecting with a computer and a printer.

Referring to FIG. 2, an optical scanner 6 according to this invention includes a casing 61 which houses therein an optical scanning means 62 movable to and fro along a guide rod 635, a transmission means 63 for driving the optical scanning means 62, a flat cable 681 for signal transmission between the optical scanning means 62 and a computer 2, and a power cable 682 for power transmission from a power supply 23 located in the computer 2 to the transmission means 63 via a cable 65 between the computer 2 and the scanner 6. On the top of the casing 61, there is a flat and transparent glass 66 upon which a scanning document 3 is disposed. A top cover 67 is pivotly covering the glass 66. The transmission means 63 includes a motor 631, a reducing gear 632, a belt 633 and a plural number of rollers 634. All of this are generally constructed like a conventional scanner except that the CCB is removed from the casing 61 and the power supply 23 is located in the computer.

The optical scanner means 62 may be a charge-coupled device (CCD) scanning means known in the art (including a light source, at least one reflection mirror, a lens and a CCD member, not shown in the figure), or a CMOS scanning means, or a CIS scanning means (including a light source and a CIS contact type scanning member, not shown in the figure). The motor 631 may be a servo motor, a step motor or a DC motor. The roller 634 may be a pulley for cog belt 633. The transmission means 63 may also be constructed by steel cable and screw bar known in the art.

While FIG. 2 uses a flatbed scanner as an example, this invention may be applied to paper feeding scanner, transparency scanner or palm scanner equally well.

Figure 3:
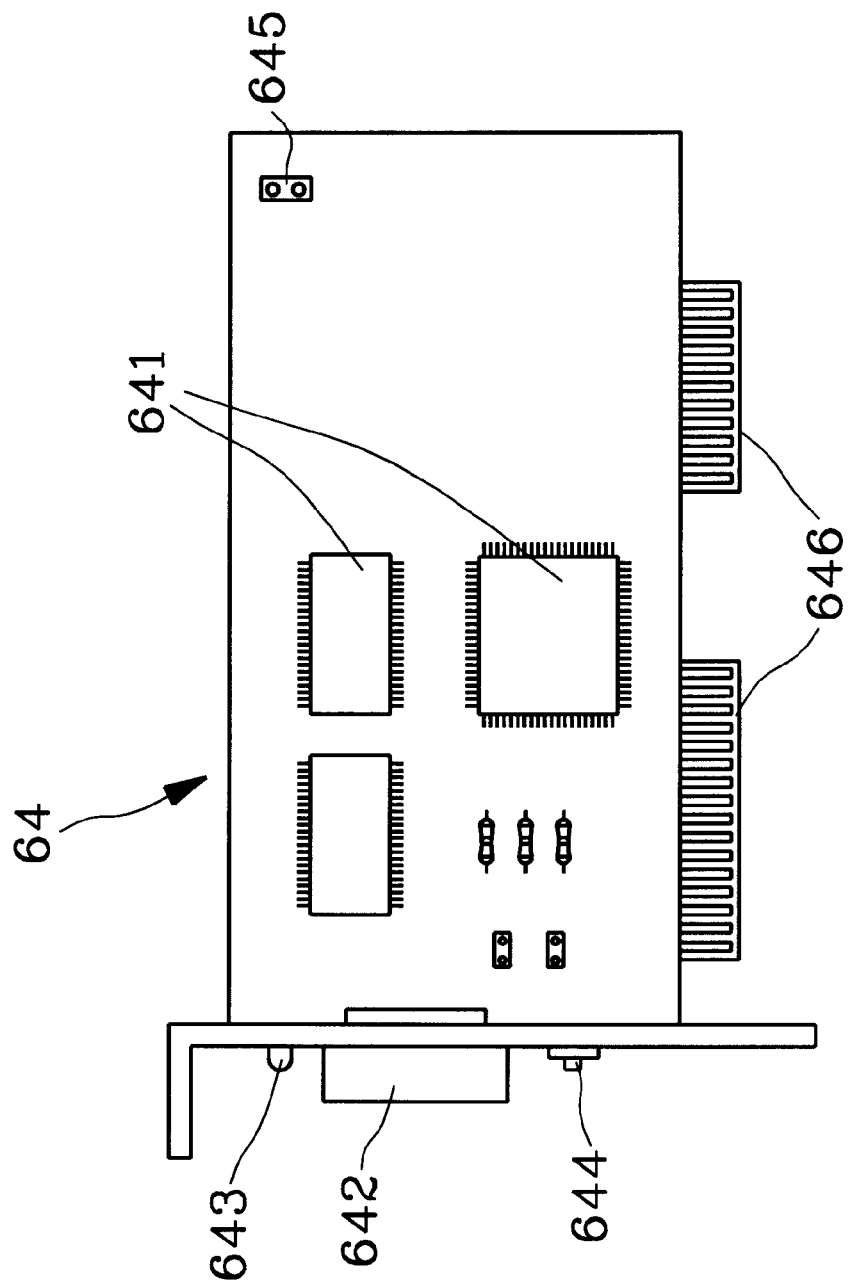
FIG. 3 is a front view of an interface card of this invention.

In FIGS. 2 and 3, an interface card 64 includes control circuit modules 641 which perform a number of functions including scanning operation of the scanning means 62, motion of the transmission means 63, conversion of scanning data to computer acceptable signals and power supply. The interface card 64 has contacts 646 engageable with the interface connectors 221 located in the computer 2. Inside the computer 2, there is provided with the power supply 23 which supports at least motherboard 22 of the computer 2 and the scanner 6.

The motherboard 22 includes a CPU and at least one ISA, VESA or PCI interface connector 221 (or bus connector). Power supply 23 supplies power through the interface card 64, a plug 651 (located at one end of the cable 65) which engages with a socket 642 on the interface card 64 and the cable 65 which links to a small circuit board 68 located in the casing 61. The circuit board 68 then wires to the flat cable 681 connecting with the scanning means 62 and the power cable 682 connecting with the transmission means 63. Hence both scanning signals and power supply of the scanner 6 may transmit to/from the computer 2 via the cable 65. The plug 651 and socket 642 may use those commercially available connectors such as D-Sub connector, IDE connector, Half Pitch SCSI connector, Full Pitch SCSI connector, Half Pitch Centronic connector, Centronic connector and the like.

Data conversion into signals in the control circuit modules 641 may be performed in a conventional parallel port format or a serial port format or other high speed format such as IDE, SCSI, USB and the like. A printer 4 may connect with the computer 2 on a separate parallel port 24 without linking to the scanner 6 of this invention. Therefore both the scanner 6 and the printer 4 may operate concurrently without one idly waiting for another. Since the interface card 64 is located within a metallic casing 21 of the computer 2, EMI is greatly reduced. In addition, the interface card 64 may also be designed to be a PCMCIA card such that it can be connected to a PCMCIA slot of a notebook computer. As the computer power supply 23 also provides power for the scanner 6, no extra power supply is needed. It is more convenient and handy to use, particularly for a notebook computer used outdoors without city power supply. The smaller size of the scanner of this invention is more sightly because of no built in circuit board. It costs less for packaging, warehousing and transportation.

The following offers more embodiment variation of this invention. Same or similar components like the embodiment set forth above will be marked by like numerals.

Figure 4:
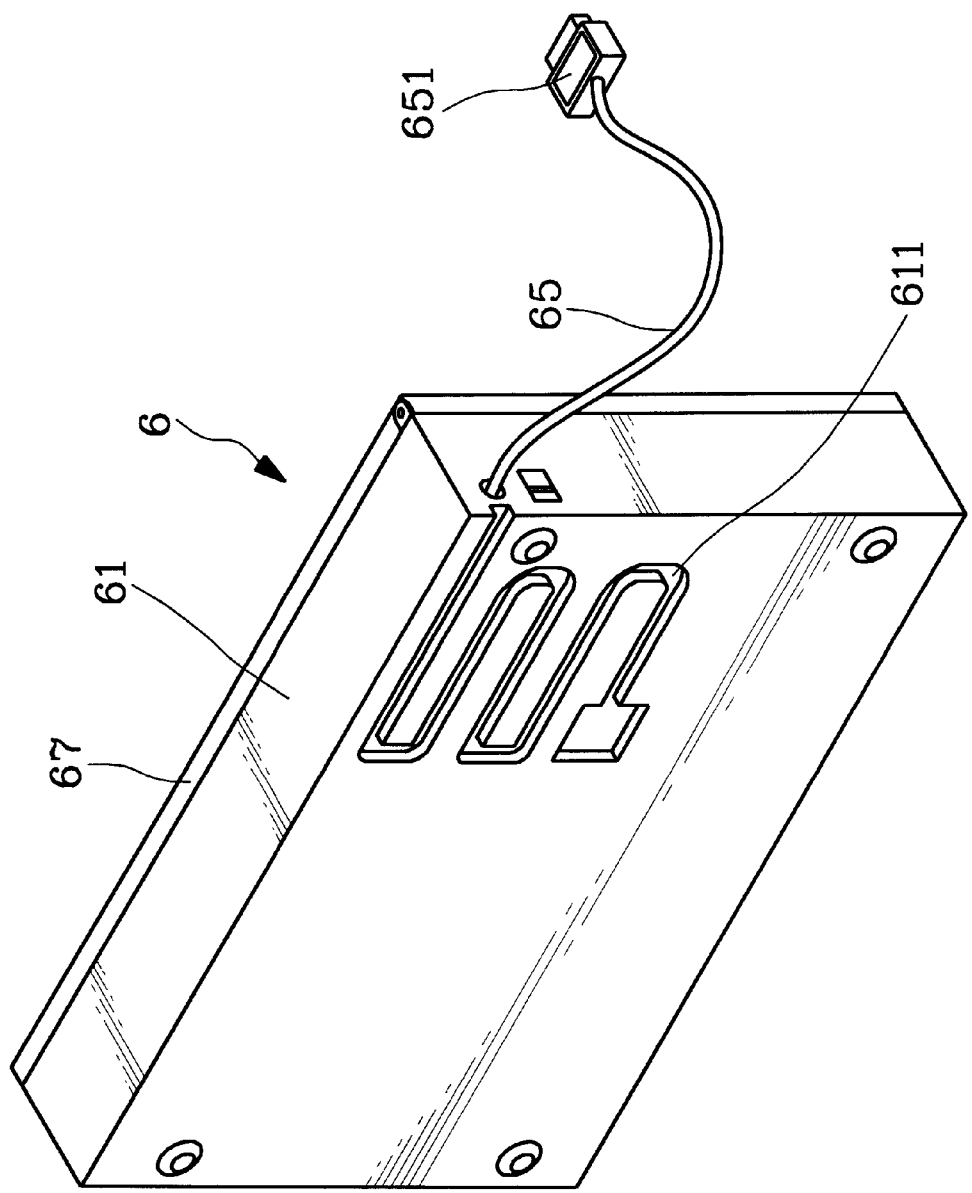
FIG. 4 is a perspective view (bottom side) of a scanner according of this invention.

FIG. 4 shows that at the bottom of the casing 61, a zigzag type groove 611 is formed to hold the cable 65 and plug 651 so that the whole scanner 6 may be packaged neatly in a small size so as to decrease packaging, housing and transporting costs.

Figure 5:
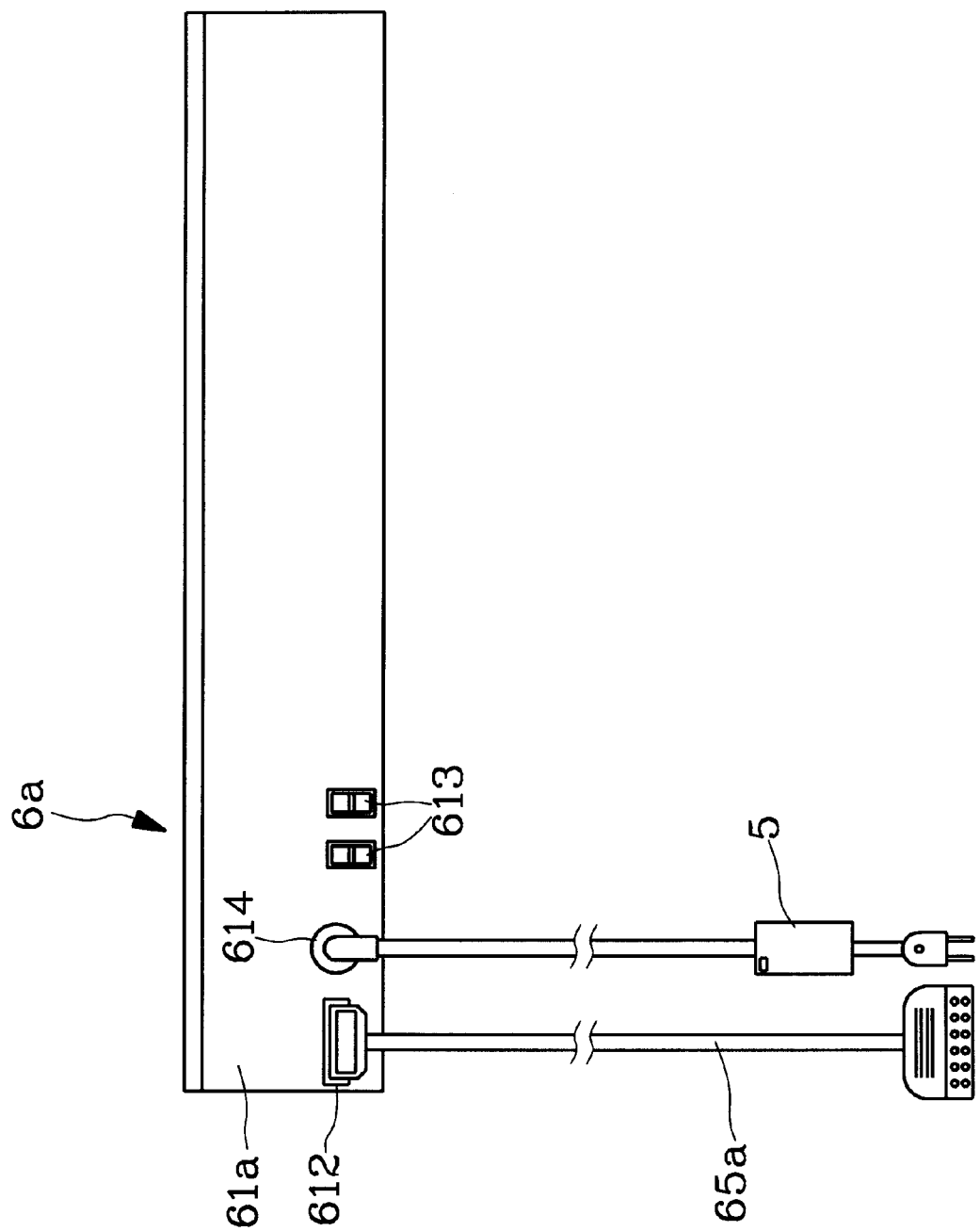
FIG. 5 is a side view of another embodiment of a scanner according to this invention.

FIG. 5 shows another variation of the scanner 6a which has a detachable cable 65a. One end of the cable 65a has a plug 612 connectable to the scanner 6a at a mating connector while another end of the cable 65 is a plug engageable with the socket 642 of the interface card 64. The casing 61a may further has a power socket 614 on a side wall. A DC power supply 5 may engage with the power socket 614 as an alternative power supply. A power selection switch 613 is provided to select the scanner 6a to be powered by the power supply of the computer or a separate DC power supply 5. This will make this invention more flexible in use. As shown in FIG. 3, on the interface card 64, there also may be provided with a switch 644 for controlling the ON/OFF of power transmission and a LED light indicator 643 to show power ON/OFF status.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An optical scanner comprising:

an optical scanning means for scanning and converting data on a document to digital signals, a transmission means for performing relative movement between the optical scanning means and the document for performing scanning operation, a casing for housing the optical scanning means and the transmission means, an interface card having a socket, a contact engagaeable with a connector on a motherboard of a computer and control circuit modules for controlling the optical scanning means to perform scanning operation and for actuating the transmission means, and a cable having one end connectable with the optical scanning means and the transmission means through the casing and another end having a plug engageable with the socket of the interface card for coupling with the control circuit modules.

2. The optical scanner of claim 1, wherein the optical scanning means includes a light source, at least one reflecting mirror, a lens and a charge-coupled device.

3. The optical scanner of claim 1, wherein the optical scanning means includes a light source and a contact-type image scanning means (CIS).

4. The optical scanner of claim 1, wherein the optical scanner is a flatbed type scanner, and the transmission means including a driving motor and a transmission mechanism for transmitting motor rotation to move the optical scanning means.

5. The optical scanner of claim 1, wherein the optical scanner is a paper feeding type scanner, and the transmission mean including a motor and a transmission mechanism for transmitting motor rotation to move the document against the optical scanning means for scanning operation.

6. The optical scanner of claim 1, wherein the motherboard is located in a computer casing of the computer, the computer having a power supply unit located in the computer casing and connectable with the motherboard for providing electrical power needed for the motherboard, the motherboard having a CPU and at least one connector engageable with the interface card so that power supply and control signals will transmit to the optical scanning means and the transmission means through the interface card and the cable.

7. The optical scanner of claim 6, wherein the interface card is by ISA specification and is engageable with an ISA connector on the motherboard.

8. The optical scanner of claim 6, wherein the interface card is by VESA specification and is engageable with a VESA connector on the motherboard.

9. The optical scanner of claim 6, wherein the interface card is by PCI specification and is engageable with an PCI connector on the motherboard.

10. The optical scanner of claim 6, wherein the control circuit modules serve as an IDE signal conversion interface between the optical scanning means and the motherboard.

11. The optical scanner of claim 6, wherein the control circuit modules serve as a SCSI signal conversion interface between the optical scanning means and the motherboard.

12. The optical scanner of claim 6, wherein the control circuit modules serve as a parallel port signal conversion interface between the optical scanning means and the motherboard.

13. The optical scanner of claim 6, wherein the control circuit modules serve as an USB signal conversion interface between the optical scanning means and the motherboard.

14. The optical scanner of claim 1, wherein the casing has a socket with an inner end coupling respectively a flat cable connecting with the optical scanning means and a power cable connecting with the transmission means, and another end thereof connectable with one end of the cable which has another end connectable with the socket of the interface card.

15. The optical scanner of claim 1, wherein the cable has one end located in the casing and coupled respectively with a flat cable connecting with the optical scanning means and a power cable connecting with the transmission means.

16. The optical scanner of claim 15, wherein the casing has a circuit board coupled with the flat cable, power cable and the cable, the circuit board being smaller size than the interface card and containing no control circuit modules.

17. The optical scanner of claim 16, wherein the casing has a switch and a power socket coupled with the circuit board, the power socket being connectable with an external DC power supply, the switch allowing the optical scanner to select either the computer power supply or the DC power supply.

18. The optical scanner of claim 1, wherein the casing has a bottom with a recess groove formed therein for holding the cable.

19. An optical scanner using with a computer which includes a motherboard which has a plural number of interface connectors and a computer power supply for providing power needed of the mother board, comprising:

an optical scanning means for scanning and converting data on a document to digital signals;

a transmission means for performing relative movement between the optical scanning means and the document to perform scanning operation;

a casing for housing the optical scanning means and the transmission means;

an interface card located outside of the optical scanner connectable with an interface connector of the motherboard having control circuit modules for controlling the optical scanning means and the transmission means, and a cable having one end connectable with the optical scanning means and the transmission means and another end thereof connectable with the interface card.

20. The optical scanner of claim 19, wherein the casing has a socket with one end coupling respectively a flat cable connecting with the optical scanning means and a power cable connecting with the transmission means, and another end thereof connectable with one end of the cable which has another end connectable with a socket of the interface card.

21. The optical scanner of claim 19, wherein the cable has one end located in the casing and coupled respectively with a flat cable connecting with the optical scanning means and a power cable connecting with the transmission means.

22. The optical scanner of claim 21, wherein the casing has a circuit board coupled with the flat cable, power cable and the cable, the circuit board being smaller size than the interface card and containing no control circuit modules.

23. The optical scanner of claim 22, wherein the casing has a switch and a power socket coupled with the circuit board, the power socket being connectable with a DC power supply, the switch allowing the optical scanner to select either the computer power supply or the DC power supply.

24. The optical scanner of claim 19, wherein the casing has a bottom with a recess groove formed therein for holding the cable.

* * * * *